March 24, 1970  W. LEHMER  3,501,923
PROCESS FOR DECONTAMINATING RADIOACTIVE FLUIDS
Filed Feb. 16, 1966  3 Sheets-Sheet 1

Inventor
WILHELM LEHMER
By Toulmin & Toulmin
Attorneys

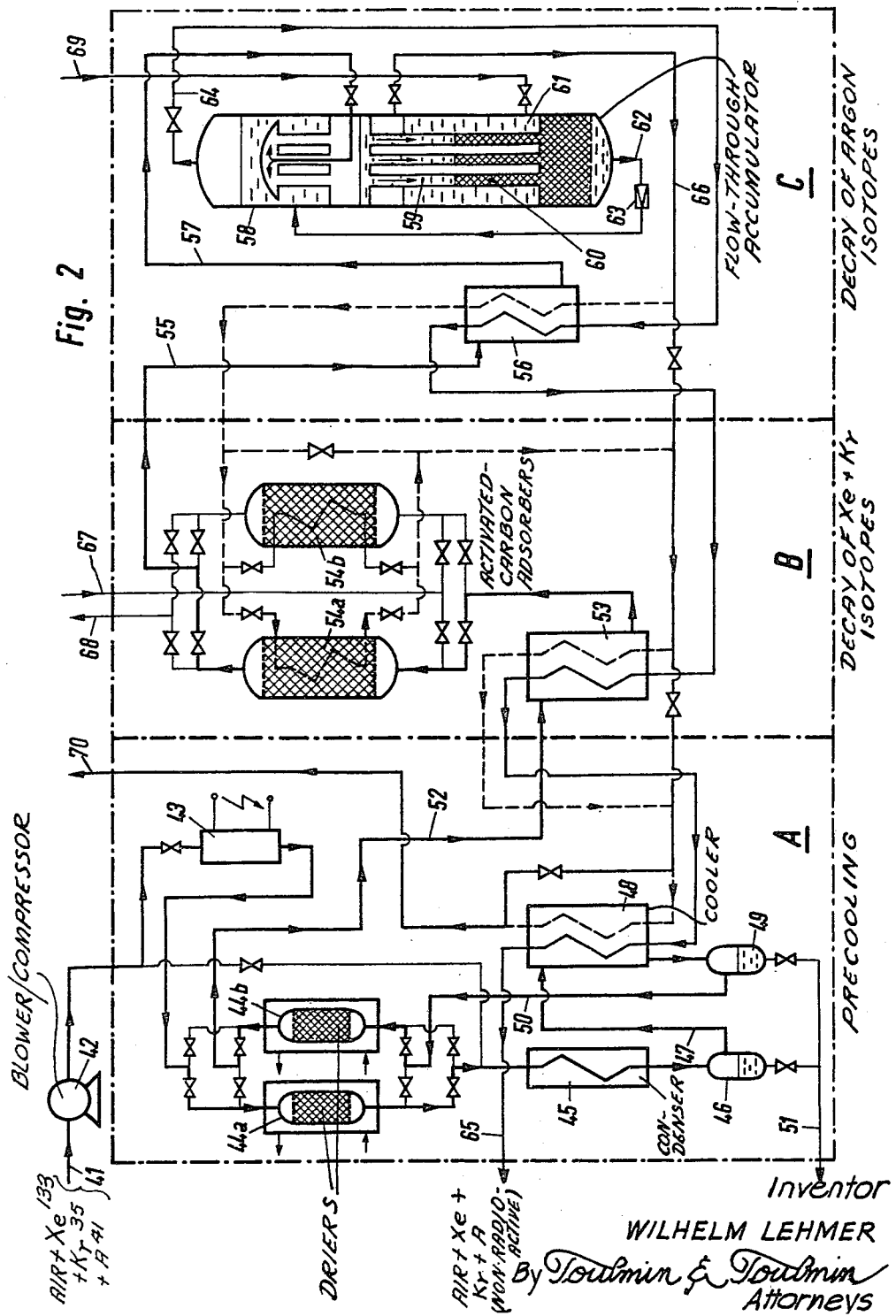

March 24, 1970 W. LEHMER 3,501,923
PROCESS FOR DECONTAMINATING RADIOACTIVE FLUIDS
Filed Feb. 16, 1966 3 Sheets-Sheet 3
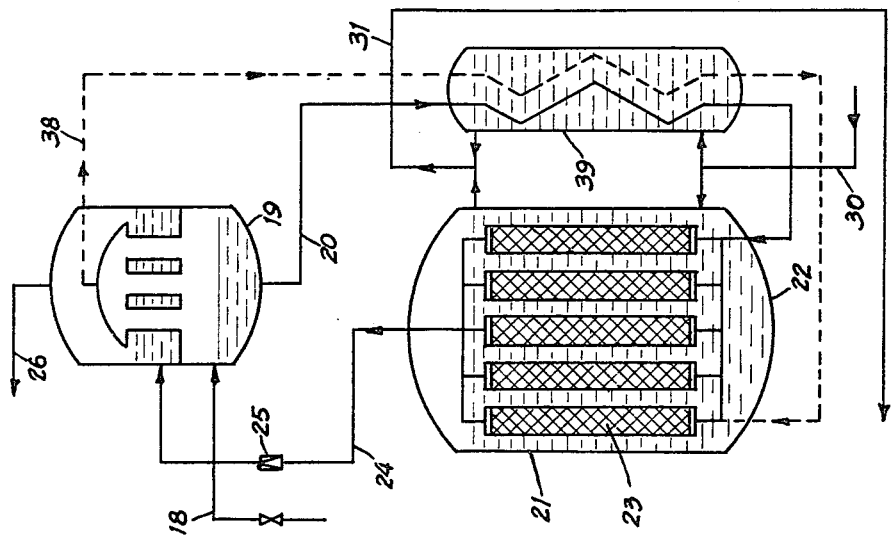
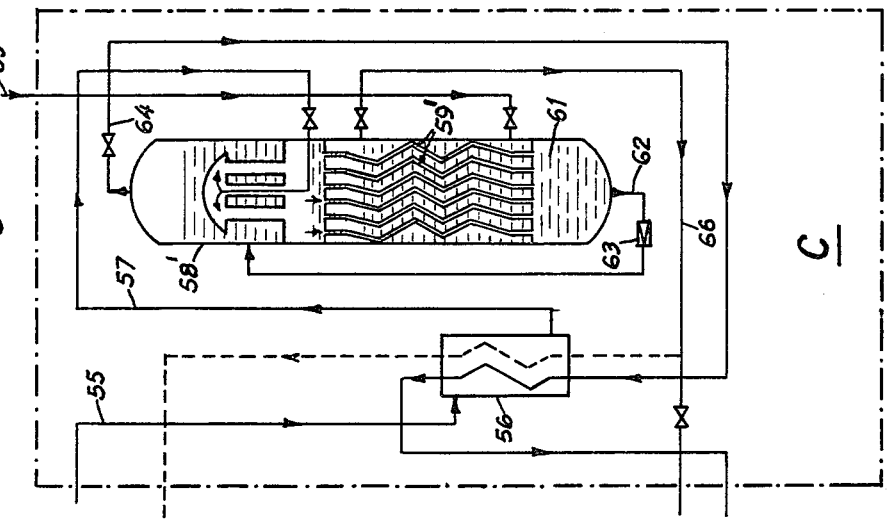
INVENTOR
WILHELM LEHMER
BY Toulmin & Toulmin
ATTORNEYS

United States Patent Office 3,501,923
Patented Mar. 24, 1970

3,501,923
PROCESS FOR DECONTAMINATING RADIOACTIVE FLUIDS
Wilhelm Lehmer, Munich, Germany, assignor to Linde Aktiengesellschaft, Hollriegelskreuth, Germany, a corporation of Germany
Continuation-in-part of application Ser. No. 301,468, Aug. 12, 1963. This application Feb. 16, 1966, Ser. No. 527,790
Claims priority, application Germany, Aug. 14, 1962, 1,444,453
Int. Cl. F25j 3/00; B01d 53/00
U.S. Cl. 62—18        7 Claims

ABSTRACT OF THE DISCLOSURE

A radioactively contaminated gas containing relatively adsorbable and less adsorbable radioactive impurities is continuously passed through an adsorber for a period of time causing the adsorber to become saturated with the relatively adsorbable impurity, the saturated condition of the adsorber being effective to hold up the flow of contaminated gas and provide a residence time in excess of the half-life of the readily adsorbable impurity whereby the latter decays to a small fraction of its original radioactivity. The flow through the adsorber is continued for a prolonged period of time following saturation and the gas is recovered with substantially unchanged proportions of the original constituents with the readily adsorbable impurity being freed from radioactivity during the prolonged period of time. The gas with reduced radioactivity is then liquefied and passed along on extended path where the less adsorbable impurity decays.

---

Figure 1:
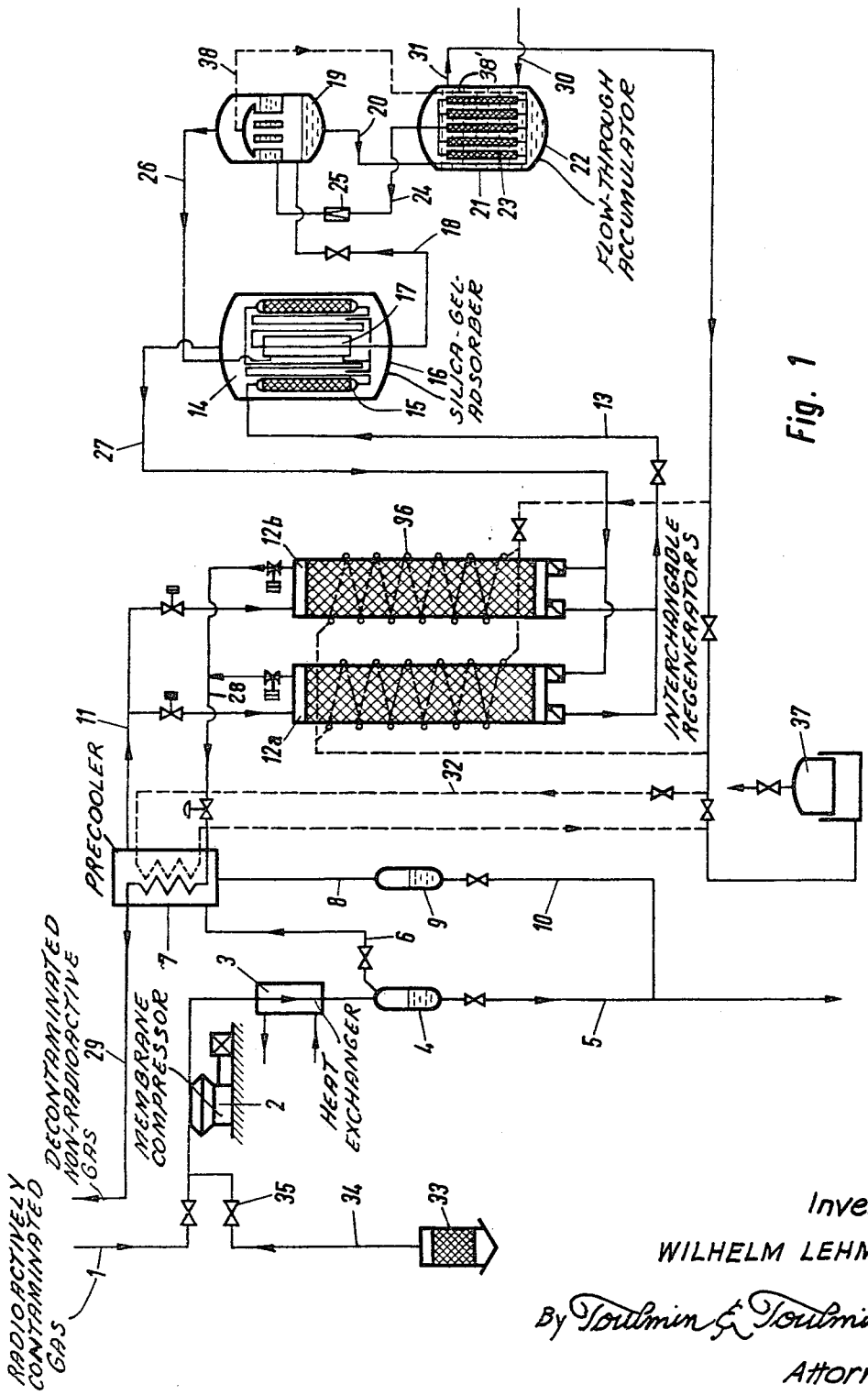

This application is a continuation-in-part of my application Ser. No. 301,468 filed Aug. 12, 1963, now abandoned.

My present invention relates to a process for the removal of radioactive contaminants from fluids, e.g. gases used as coolants and/or protective agents in atomic reactors, isotope laboratories and the like.

Air or other gases in contact with nuclear installations tend to entrain gaseous constituents in radioactive form which would dangerously increase the radiation level of the atmosphere or any other environment into which they are subsequently released.

Since some of the radioactive gaseous constituents of such fluids have a half-life ranging from several hours to a few days, storage of the entire fluid for a period long enough to insure substantial decay is cumbersome and expensive. An alternate solution is the selective adsorption of these gaseous isotopes at low temperatures by a batch process, the adsorber being taken out of service upon its saturation and being held inactive until the radioactivity of the adsorbed contaminant has practically subsided whereupon the absorber is purged and the process is repeated; this procedure requires prolonged storage of an adsorber at low temperatures and necessitates particularly heavy construction to withstand the gas pressures that arise upon reheating.

The general object of my invention is to provide a decontamination process for isotope-laden fluids, particularly gases, which avoids the aforestated disadvantages.

A more particular object of my invention is to provide a process of this description which can be carried out in a continuous or nearly continuous manner over a period of operation which is large compared with the half-life of the slowest-decaying significant radioactive contaminant.

This object is realized, pursuant to the present invention, by the continuous passage of a radioactively contaminated gas through a retarder in which the gas, or at least one of its radioactive constituents, is propagated at a rate slow enough to retain this constituent in the retardation zone for a period substantially in excess of the half-life thereof whereby this constituent decays to a small fraction of its original radioactivity, the flow of the contaminated gas through the retardation zone continuing, after the emergence of the decayed constituent from the other end of the zone, for a prolonged period during which the gas is recovered with susbtantially unchanged proportions of its original constituents but with at least a market reduction of its initial radioactivity.

The retarder may take the form of a selective adsorber having an affinity for at least the slowest-decaying significant isotope which diffuses at a slow rate through the adsorber while the other constituents, especially the non-radioactive ones, pass rapidly through it. On the other hand, the retarder may also be a flow-through accumulator continuously traversed by the fluid in liquid form, with all the constituents of the fluid retarded at substantially the same rate sufficient to allow the practically complete decay of at least one significant isotope during the time of passage.

In a typical system utilizing the process according to this invention, the significant contaminants may include such rare-gas isotopes as $Xe^{133}$, $Kr^{85}$ and $Ar^{41}$. The xenon isotope has a half-life of more than five days whereas the argon isotope has a corresponding period of less than two hours; the half-life of the krypton isotope has an intermediate value of about 4½ hours. In an adsorber charged with silica gel, for example, xenon and krypton will be delayed for considerable periods whereas argon as well as air pass through it without substantial retardation. It thus becomes possible to design an adsorber of this or equivalent type which retards the xenon for a time of several times its half-life to insure a decay of its radioactivity to not more than a few percentage points. In an adsorber of such capacity that it will take continuously admitted xenon 40 days to diffuse through it, krypton is retarded by about two days so that this gas, too, dwells therein for a period long enough to let its radioactivity fall to a fraction of one percent. As the rest of the gaseous constituents, including the relatively non-adsorbable argon, traverse the adsorber without substantial retardation during a time which may be on the order of 10 minutes, this mode of operation will not be satisfactory in the case of an isotope such as $Ar^{41}$. Such a relatively rapidly decaying contaminant may be deactivated, in accordance with another aspect of my invention, by connecting a flow-through accumulator of the aforedescribed character in series with the adsorber for traversal by the liquefied fluid in about a day's time, thus insuring practically complete decontamination of the treated gas.

Circumstances extraneous to the process of this invention may make it necessary, when using an adsorber-type retarder, to interrupt the flow through the adsorber at prolonged intervals, i.e. (in the case of xenon) after an operating period substantially greater than the 40-day residence time mentioned above. This situation may arise, for example, in the presence of an impurity such as $CO_2$ in the gas stream which slowly poisons the charge of silica gel and thus necessitates occasional interruption of the adsorption process, preferably with switchover to an alternate adsorber while the first one is being regenerated.

The invention will be described in greater detail with reference to the accompanying drawing in which:

FIGS. 1 and 2 are flow diagrams of two representative systems embodying the invention; and FIGS. 3 and 4 are diagrammatic views of modifications of certain units shown in the preceding figures.

FIG. 1 shows a system designed for the cleansing of air coming, for example, from a boiling-water reactor where it has taken up radioactive gases and which is to be again released in the atmosphere with no more than the permissible amount of radioactivity. The same system can also be used for the removal of radioactive impurities from the circulating gases of reactors, glove boxes, bunkers or other spaces contaminated by radioactivity.

In the present example a continuous flow of 10 m.$^3$/hr. (S.T.P.) of air contaminated with radioactive xenon, krypton and argon, drawn off from the condenser of a boiling-water reactor, is passed under a pressure of about 1 atmosphere through a recombiner in which the radiolytically decomposed ordinary or heavy water is recombined, and then moves through a conduit 1 to a compressor 2, preferably a membrane compressor, in which the air is compressed to 8 atmospheres. This air is then cooled in a water-cooled heat-exchanger 3. The condensate, generally water, is collected in a separator 4 from which it is discharged by a pipe 5 as waste. From the head of separator 4 the radioactively contaminated air is passed through a conduit 6 to a countercurrent precooler 7 in which it is cooled to about 0° C. The liquid that collects therein is allowed to flow through a pipe 8 to a separator 9 from which it is delivered by a pipe 10 to pipe 5 to be discharged as waste water. The air which has been freed from water is then conducted through a conduit 11 to one of two interchangeable and alternately operable regenerators 12a, 12b, in the case illustrated to regenerator 12a, to be further cooled therein to about 105° K. and to be freed from other condensable impurities, especially carbon dioxide; the gas is then delivered by a conduit 13 to a selective adsorber 14 for partial decontamination by retardation in accordance with this invention.

The retarding adsorber 14 consists of a bundle of serially connected tubes 15, filled with silica gel, which are enclosed in a housing 16. For cooling the gases, there is built into this adsorber a countercurrent heat exchanger 17. For the adsorption of xenon and krypton from gas flowing at the aforestated rate, 16 serially connected tubes are provided, each tube containing about 10 kg. of silical gel. The residence time for radioactive decay is about 40 days for xenon and about 2 days for krypton.

After an extended interval, considerably longer than 40 days, the adsorber 14 may have to be regenerated because of accumulating carbon dioxide. The fluid flow will then be interrupted, or switched to an alternate adsorber in the manner described hereinafter with reference to FIG. 2.

After traversing the adsorber, the gas enters a countercurrent heat exchanger 17 to be further cooled and partially liquefied, passing then through a conduit 18 to a condenser/vaporizer 19 in which the gas, by heat exchange with vaporizing liquid whose radioactivity has subsided, is liquefied. The resultant liquid is delivered by a pipe 20 to a retarding flowthrough accumulator 21 in which final decontamination takes place according to this invention.

The flow-through accumulator 21 comprises a jacket 22 surrounding a number of vertical tubes 23 connected in parallel and filled with packing to prevent cross-flow. The tubes have a capacity of about 350 liters. The liquid which is delivered by the pipe 20, and in which the radioactivity of the argon has not yet materially decayed, is first cooled to a few degrees below its boiling point and is then delivered to the lower ends of tubes 23. It traverses these tubes during about one day. The liquid is then conducted through a pipe 24 to a valve 25 in which it is expanded to about 1.7 atmospheres and whence it is conducted into the upper part of the condenser/vaporizer 19 in which it is vaporized by heat exchange with the condensing and still radioactive oncoming fluid. The resulting gas is returned through the heat exchanger 17 inside the jacket of the retarding adsorber 16 and from there through a conduit 27 to regenerator 12b in which it is warmed while entraining the nonradioactive impurities, such as $CO_2$, previously stored therein. From there the gas is delivered by a conduit 28 to countercurrent precooler 7 whence it is released through a conduit 29 to the atmosphere.

The retarding flow-through accumulator 21 is cooled below the boiling point of the liquid delivered by the pipe 20 by external refrigeration so that no vapor bubbles will be formed. For this supercooling it is advantageous to use liquid air or liquid nitrogen under atmospheric pressure which is delivered by a pipe 30 and removed in gaseous form through a conduit 31. For the production of the liquid air, the usual kinds of machines can be used. A portion of the gaseous air flow from conduit 31 can be branched off by a conduit 32 (shown in dotted lines) as a supplemental cooling fluid to the countercurrent precooler 7 and can also be passed through coils 36 to cool the regenerators 12a and 12b. The warmed gas can be collected in a storage tank 37. Noncondensed gas can be taken from the condenser/vaporizer 19 by a conduit 38 (dotted lines) for delivery to the peripheral space 38' of accumulator 21 where it is condensed and cooled by liquid air or some other external source of refrigeration.

For starting up the apparatus and for filling it with nonradioactive gas, a suction filter 33 is provided which is connected by a conduit 34 and a valve 35 with the compressor 2. During normal operation the valve 35 is closed. In order to ensure continuous operation while the compressor is taken out of service, e.g. for repairs, it is advisable to provide one or two standby sets with duplicates of the compressor 2, the cooler 3 and the separator 4 and, preferably, with a mechanism for automatically switching from one set to another when one fails.

In FIG. 2 a modified apparatus is shown in which no regenerators are used and wherein the condenser/evaporator and the retarding flow-through accumulator are combined into one structure. Dot-dash lines are used to separate the functionally distinct parts of the apparatus from one another.

The dot-dash lines define three compartments A, B and C. Part A contains precooling and drying units which operate at temperatures down to 0° C., part B contains cooling and adsorption units which operate at temperatures between 0° C. and 150° K., and part C contains deep-freezing and condensing units which operate at temperatures from 150° K., down to 80° K.

A conduit 41 again delivers air with radioactive impurities at a rate of 10 m.$^3$/hr. (S.T.P.) and under a pressure of 1 atmosphere to a blower 42 which compresses it to 2 atmospheres and sends it to an electric heater 43 of about 500 watts for heating to about 150° C. The air then passes through a drier 44a and regenerates its charge of alumina gel which had been loaded with moisture in a previous phase. The moisture-laden air then passes through a water-cooled heat exchanger 45 in which the moisture is condensed and whence it is then removed via a separator 46.

The dried air is taken from the upper portion of the separator 46 by a conduit 47 which delivers it to a heat exchanger 48 wherein it is cooled to about 0° C. The condensed water is removed by a separator 49 while the air passes through a conduit 50 to a drier 44b. The two switchable driers 44a, 44b are enveloped by jackets through which a coolant or a heating medium can be circulated. Ordinarily, before changing over from the regeneration phase to the adsorption phase, a cooling medium is passed therethrough. The liquid which has collected in the separators 46 and 49 is discharged by a pipe 51 to the outside. The above-mentioned regeneration of the adsorbers by the warmed gas to be treated is preferable to regeneration by gas from another source since it prevents radioactive contamination of an extraneous fluid.

The dried air which leaves the drier 44b is delivered by a conduit 52 to a countercurrent exchanger 53, in which it is cooled to about 150° K., and is then conducted to one of two interchangeable retarding adsorbers 54a, 54b, filled with activated carbon, here the adsorber 54a, wherein the radioactivity due to the xenon in the air will be reduced to a safe value by prolonged residence of this constituent in the adsorber.

The adsorbers 54a, 54b are again duplicated to permit occasional regeneration which may be necessary if substances like $CO_2$ are precipitated in the solid state. Such regeneration is accomplished by warm air which enters through a conduit 67, passes through the idle adsorber (here unit 54b) and is then released to the outside by a conduit 68.

The air to be purified, which has passed through the adsorber 54a, is then delivered by a conduit 55 to a countercurrent exchanger 56 in which it is cooled to about 85° K. and is then delivered by a conduit 57 to the upper part of a retarding flow-through accumulator 58 where it is condensed by heat exchange with vaporizing liquid air which has previously passed through the accumulator.

The condensed liquid descends through vertical tubes 59 that are positioned in the lower portion of the accumulator 58 and which are at least partly filled with packing 60. These tubes are surrounded by a liquid cooling medium, preferably liquid nitrogen, delivered by a pipe 69 to cool the liquid inside these tubes sufficiently so that no vapor bubbles will be formed. After passage through the accumulator, the radioactivity of the remaining ingredients such as argon will have dropped down to a permissible level.

The liquid is then removed by a pipe 62, expanded by a valve 63, and released into the upper part of the accumulator 58 where it is vaporized by the newly arriving air which condenses there. The reconstituted and decontaminated air is led away by a conduit 64 for passage through heat exchangers 56, 53 and 48 for further warming in countercurrent relation to the air to be purified, after which it is released by a conduit 65 to the outside. The accumulator 58 can also be duplicated for alternate switchover at long intervals if there is an accumulation of solid $CO_2$.

The nitrogen which evaporates into a space 61 of accumulator 58 is removed by a conduit 66 and either can be discharged directly into the atmosphere at 70 or, as indicated by dotted lines, can be passed through supplementary cooling coils of heat exchangers 56, 53 and 48 or in retarding adsorbers 54a and 54b.

In addition to the use of silica gel and activated carbon, other adsorbents may be employed for the removal of krypton and xenon, a typical microporous substance suitable for this purpose being zeolite.

It is also to be noted that the order of retardation by adsorption and liquefaction can be reversed if desired, i.e. the liquefied gas may be treated in a flow-through accumulator before it is passed, preferably again in a gaseous state, through a selective adsorber.

The permissible level of residual radioactivity and therefore the residence time of the fluid in the adsorbers and/or the accumulators is predetermined according to the ultimate destination of the purified gas. In the case of air vented to the atmosphere, a radiation level of $10^{-12}$ to $10^{-14}$ curie/cm.$^3$ (S.T.P.) may be considered satisfactory.

As illustrated in FIG. 3, section C of FIG. 2 may be replaced by a section C' whose accumulator 58' is equipped with undulating or helicoidal tubes 59' in lieu of straight vertical tubes 59, thereby eliminating the need for any packing 60 as shown in FIG. 2.

In FIG. 4 I have shown a supplemental heat exchanger 39 through which the gas from branch line 38 passes on its way to accumulator 21 along with the liquefied fluid from pipe 20, thereby intensifying the heat exchange between the two media.

The accumulators 21 and 58 are representative of a variety of retarders in which a continuous flow of liquid moves progressively and in the absence of agitation, thus without any backward motion or intermingling of portions arriving at different times, this type of progressive advance being sometimes referred to as "slug flow." If the conduit confining the flow is sufficiently narrow and elongated, e.g. a pipe of a diameter of not more than about 4 mm., no packing material need be provided therein.

The present process is, of course, not limited to the specific embodiments described and illustrated but may be carried out in various modifications without departing from the spirit and scope of my invention as defined in the appended claims. Thus, for example, the heat exchanger 17 incorporated into the adsorber 14 of FIG. 1 could also be disposed before or behind this adsorber in series therewith.

I claim:
1. A process for the decontamination of radioactively contaminated gas which contains an adsorbable radioactive impurity, comprising the steps of continuously passing said gas through an adsorber at a rate saturating said adsorber with said impurity over a period substantially in excess of the half-life of said impurity, the saturated condition of the adsorber being effective to hold up the flow of contaminated gas and provide a residence time in excess of the half-life of the impurities whereby the latter decays to a small fraction of its original radioactivity, continuing the flow of the radioactively contaminated gas through the adsorber for a prolonged period of time following its saturation, and recovering the gas with substantially unchanged proportions of the original constituents thereof, and with said impurity substantially freed from radioactivity during said prolonged period of time.

2. A process as defined in claim 1 wherein said prolonged period of time is long enough to cause the decay of the radioactivity of said impurity to a value on the order of one percent of its original magnitude.

3. A process as defined in claim 1 wherein said contaminant is a xenon isotope with a half-life of several days, said gas being passed through said adsorber at a rate saturating the latter after a period of several weeks during which the xenon progressively diffuses through said adsorber.

4. A process as defined in claim 1 wherein said gas is liquefied and passed through a flow-through accumulator forming an extended path for a progressive flow of liquid, said gas being liquefied before entering upon said path.

5. A process as defined in claim 4 wherein the liquefied gas contains an argon isotope with a half-life on the order of hours, the liquefied gas being advanced along said path at a rate of a complete traverse in approximately one day.

6. A process as defined in claim 4 wherein the gas contains two radioactive impurities including a xenon isotope and an argon isotope, said flow rate being so chosen that the residence time of said xenon isotope in said adsorber is on the order of forty days and said extended path defines a residence time of the liquid on the order of one day.

7. A process for the decontamination of radioactively contaminated gas containing relatively adsorbable and less readily adsorbable radioactive impurities, comprising the steps of:
continuously passing the contaminated gas, prior to liquefaction thereof, through an adsorber at a rate saturating said adsorber with said relatively adsorbable impurity over a period substantially in excess of the half-life of said relatively adsorbable impurity, the saturated condition of the adsorber being effective to hold up the flow of contaminated gas and providing residence time in excess of the half-life of said relatively adsorbable impurity whereby said relatively adsorbable impurity decays to a small fraction of its original radioactive;
continuing the flow of the radioactively contaminated gas through the adsorber for a prolonged period of time following its saturation;

recovering the gas with substantially unchanged proportions of the original constituents thereof, and with said relatively adsorbable impurity substantially free from radioactivity during said prolonged period;

liquefying by cooling said gas in which the radioactivity has been reduced;

continuously passing the liquid resulting from liquefying said gas along an extended path sustaining a progressive flow of the liquid while retarding same along said path for a residence time in excess of the half-life of said less readily adsorbable impurity whereby the latter decays in said liquid to a small fraction of its original radioactivity; and recovering from the liquid emerging from said path the gas with substantially unchanged proportion of the original constituents thereof and with said impurities substantially freed from radioactivity.

References Cited

UNITED STATES PATENTS

| 2,793,507 | 5/1957 | Huilicka | 62—22 XR |
| 2,835,343 | 5/1958 | Wolff et al. | 55—66 |
| 2,918,801 | 12/1959 | First et al. | 62—18 XR |
| 3,028,327 | 4/1962 | Weeks. | |
| 3,093,564 | 6/1963 | Weisman et al. | 55—179 XR |
| 3,126,264 | 3/1964 | Damsz | 62—18 XR |
| 3,126,266 | 3/1964 | Meisler | 62—18 |
| 3,155,469 | 11/1964 | Lehmer et al. | 55—66 |
| 3,203,866 | 8/1965 | Lehmer et al. | 62—18 XR |

NORMAN YUDKOFF, Primary Examiner

V. W. PRETKA, Assistant Examiner

U.S. Cl. X.R.

55—66, 74; 62—22; 176—37; 252—301.1